United States Patent
Du et al.

(10) Patent No.: US 11,170,133 B2
(45) Date of Patent: *Nov. 9, 2021

(54) EXTERNAL TERMINAL PROTECTION DEVICE AND PROTECTION SYSTEM FOR DATA FLOW CONTROL

(71) Applicant: BEIJING BEYONDINFO TECHNOLOGY CO., LTD., Beijing (CN)

(72) Inventors: Hua Du, Beijing (CN); Wei Ai, Beijing (CN); Zhenhe Cai, Beijing (CN); Hao Zhang, Beijing (CN)

(73) Assignee: Beijing Beyondinfo Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/978,774

(22) PCT Filed: Jan. 16, 2019

(86) PCT No.: PCT/CN2019/072030
§ 371 (c)(1),
(2) Date: Sep. 8, 2020

(87) PCT Pub. No.: WO2020/087782
PCT Pub. Date: May 7, 2020

(65) Prior Publication Data
US 2020/0410140 A1  Dec. 31, 2020

(30) Foreign Application Priority Data

Oct. 29, 2018 (CN) .......................... 201811264762.7

(51) Int. Cl.
*G06F 21/85* (2013.01)
*G06F 13/42* (2006.01)
(Continued)

(52) U.S. Cl.
CPC .......... *G06F 21/85* (2013.01); *G06F 13/4282* (2013.01); *G06F 21/10* (2013.01); *H04L 63/20* (2013.01); *G06F 2221/2141* (2013.01)

(58) Field of Classification Search
CPC ...... G06F 21/10; G06F 21/85; G06F 13/4282; G06F 2221/2141; H04L 63/20
(Continued)

(56) References Cited

U.S. PATENT DOCUMENTS 5,889,776 A * 3/1999 Liang ..................... H04L 49/25
370/389
6,301,815 B1 * 10/2001 Sliwa .................... F41A 17/066
42/70.01
(Continued)

FOREIGN PATENT DOCUMENTS

CN   101520831 B  *  8/2011
CN   101707561 B  *  6/2012
(Continued)

OTHER PUBLICATIONS

Ramachandran, Aravind, and Murat Kantarcioglu. "Smartprovenance: a distributed, blockchain based dataprovenance system." In Proceedings of the Eighth ACM Conference on Data and Application Security and Privacy, pp. 35-42. 2018. (Year: 2018).*
(Continued)

*Primary Examiner* — Luu T Pham
*Assistant Examiner* — Walter J Malinowski
(74) *Attorney, Agent, or Firm* — Zhu Lehnhoff LLP

(57) ABSTRACT

The present invention discloses an external terminal protection device for data flow control and a corresponding protection system. The external terminal protection device includes: an interface control module, used for providing a plurality of data interfaces respectively connected to a protected host and one or more external devices; and a
(Continued)

US 11,170,133 B2
Page 2 system control module, used for monitoring in real time a data transmission state of each data interface in the interface control module, and controlling the data flow of each data interface. The present invention realizes the functions of performing protocol filtering and auditing on various types of data flow without installing flow monitoring and security protection software on the protected host, and achieves the effects of low-latency network auditing and high-reliability protocol filtering, thereby comprehensively eliminating potential security hazards such as Trojan Horse virus implantation and flow anomaly that may be generated by the interfaces.

16 Claims, 5 Drawing Sheets

(51) Int. Cl.
   G06F 21/10 (2013.01)
   H04L 29/06 (2006.01)
(58) Field of Classification Search
   USPC .......................................................... 726/1
   See application file for complete search history.

(56) References Cited

U.S. PATENT DOCUMENTS

| | | | | |
|---|---|---|---|---|
| 6,886,104 | B1* | 4/2005 | McClurg | G06K 9/00013 |
| | | | | 320/156 |
| 7,490,350 | B1* | 2/2009 | Murotake | H04W 12/088 |
| | | | | 726/11 |
| 9,436,820 | B1* | 9/2016 | Gleichauf | H04L 63/02 |
| 9,678,507 | B1* | 6/2017 | Douglas | G08G 5/0069 |
| 10,885,230 | B1* | 1/2021 | Du | G06F 21/44 |
| 10,931,641 | B1* | 2/2021 | Du | H04L 63/029 |
| 2003/0198015 | A1* | 10/2003 | Vogt | G06F 1/163 |
| | | | | 361/679.03 |
| 2004/0064631 | A1* | 4/2004 | Kishon | G11B 33/1406 |
| | | | | 711/100 |
| 2004/0205215 | A1* | 10/2004 | Kouvelas | H04L 45/16 |
| | | | | 709/231 |
| 2005/0028027 | A1* | 2/2005 | Kroening | G06F 11/1415 |
| | | | | 714/6.32 |
| 2009/0254985 | A1* | 10/2009 | Weller | G06F 21/53 |
| | | | | 726/11 |
| 2010/0271951 | A1* | 10/2010 | Dujardin | H04L 63/0272 |
| | | | | 370/241 |
| 2011/0083177 | A1* | 4/2011 | Eddahabi | G06F 21/10 |
| | | | | 726/19 |
| 2011/0093623 | A1* | 4/2011 | Chen | G06F 1/1632 |
| | | | | 710/14 |
| 2012/0331304 | A1* | 12/2012 | She | G06F 21/602 |
| | | | | 713/189 |
| 2013/0046886 | A1* | 2/2013 | Pannell | H04L 41/22 |
| | | | | 709/224 |
| 2013/0142241 | A1* | 6/2013 | Tanikawa | H04L 45/22 |
| | | | | 375/224 |
| 2013/0167250 | A1* | 6/2013 | Balasubramanian | G06F 21/31 |
| | | | | 726/28 |
| 2014/0032350 | A1* | 1/2014 | Biswas | G06Q 30/018 |
| | | | | 705/26.3 |
| 2014/0130142 | A1* | 5/2014 | Plewnia | H04L 63/102 |
| | | | | 726/5 |
| 2014/0337558 | A1* | 11/2014 | Powers | G06F 9/45558 |
| | | | | 710/313 |
| 2015/0186657 | A1* | 7/2015 | Nakhjiri | H04L 9/0894 |
| | | | | 713/155 |
| 2015/0271177 | A1* | 9/2015 | Mun | H04L 63/0853 |
| | | | | 726/7 |
| 2015/0356034 | A1* | 12/2015 | Pamley | G06F 13/4027 |
| | | | | 710/308 |
| 2016/0055322 | A1* | 2/2016 | Thomas | H04L 63/0876 |
| | | | | 726/7 |
| 2017/0302689 | A1* | 10/2017 | Jiang | G06F 21/568 |
| 2018/0063477 | A1* | 3/2018 | Yu | H04N 7/142 |
| 2018/0077568 | A1* | 3/2018 | Young | H04W 12/0608 |
| 2018/0268144 | A1* | 9/2018 | Warpinski | G06F 21/85 |
| 2018/0284842 | A1* | 10/2018 | Han | H04M 1/04 |
| 2018/0293197 | A1* | 10/2018 | Grobelny | G06F 13/4291 |
| 2018/0349700 | A1* | 12/2018 | Percuoco | G06Q 10/00 |
| 2019/0342724 | A1* | 11/2019 | Kotab | H04M 1/2757 |

FOREIGN PATENT DOCUMENTS

| | | | | | |
|---|---|---|---|---|---|
| CN | 102624533 | A | * | 8/2012 | |
| CN | 102929329 | A | * | 2/2013 | |
| CN | 103020546 | A | | 4/2013 | |
| CN | 103020546 | A | * | 4/2013 | |
| CN | 103532978 | A | * | 1/2014 | |
| CN | 103532978 | A | | 1/2014 | |
| CN | 103532980 | A | * | 1/2014 | |
| CN | 103778388 | A | * | 5/2014 | |
| CN | 103778388 | A | | 5/2014 | |
| CN | 203618018 | U | * | 5/2014 | |
| CN | 203618020 | U | * | 5/2014 | |
| CN | 104915597 | A | | 9/2015 | |
| CN | 104915597 | A | * | 9/2015 | |
| CN | 205210890 | U | | 5/2016 | |
| CN | 205210890 | U | * | 5/2016 | |
| CN | 106022094 | A | * | 10/2016 | |
| CN | 206003099 | U | | 3/2017 | |
| CN | 206003099 | U | * | 3/2017 | |
| CN | 107239419 | A | * | 10/2017 | |
| CN | 109522760 | A | * | 3/2019 | |
| CN | 109543475 | A | * | 3/2019 | |
| CN | 109561071 | A | * | 4/2019 | |
| FR | 2949888 | A1 | * | 3/2011 | .......... G06F 21/567 |
| RU | 130429 | U1 | * | 4/2013 | |
| WO | WO-2006026054 | A1 | * | 3/2006 | .......... G06F 13/385 |
| WO | 20120106049 | A1 | | 8/2012 | |
| WO | WO-2013184864 | A2 | * | 12/2013 | ......... G06F 13/4081 |

OTHER PUBLICATIONS

Almenarez. "Building an Open Toolkit of Digital Certificate Validation for Mobile Web Services." In 2008 Sixth Annual IEEE International Conference on Pervasive Computing and Communications (PerCom), pp. 560-565. IEEE, 2008. (Year: 2008).*

Atkinson, Gerald L. "Technology transfer utilizing automated knowledge acquisition tools." In Proceedings of the 3rd international conference on Industrial and engineering applications of artificial intelligence and expert systems—vol. 2, pp. 1122-1131. 1990. (Year: 1990).*

Grzech. "Applications of the future internet engineering project." In 2012 13th ACIS International Conference on Software Engineering, Artificial Intelligence, Networking and Parallel/Distributed Computing, pp. 635-642. IEEE, 2012. (Year: 2012).*

International Search Report in PCT/CN2019/072030, issued by ISA, dated Jan. 16, 2019.

Written Opinion of the International Search Report in PCT/CN2019/072030, issued by ISA, dated Jul. 3, 2019.

* cited by examiner

EXTERNAL TERMINAL PROTECTION DEVICE AND PROTECTION SYSTEM FOR DATA FLOW CONTROL

TECHNICAL FIELD

The present invention relates to the technical field of computer security, and more particularly to an external terminal protection device for data flow control and a corresponding protection system.

BACKGROUND

In recent years, the computer and network technology develops rapidly, thereby greatly promoting the popularization of networks. While people are enjoying the convenience brought by network flow, the technology also brings new threats to data flow security in computers used by people in production/life, such as the following common threats: flow attack, hacker stealing, unauthorized access, personating a valid user, destroying data integrity, interfering normal system operation, utilizing a network to spread virus, man-in-the-middle eavesdrop and the like.

The technical means to solve the problems of intranet computer network flow management and information security are varied, for example, installing and using a network security product in a host such as flow control software, a firewall, an anti-virus and intrusion detection system and the like. However, even if the above measures are taken, various network security events still occur frequently. According to statistics, 70% of computer crimes occur because an internal person illegally uses a key resource such as the host and the like, and the threats really coming from the outside are only 30%. The internal person lacks security awareness when using the host. The behaviors of the internal person at the back end of the firewall, such as nonstandard access of various external devices, data flow anomaly and even network paralysis due to Trojan Horse implantation, system mis-operation or intentional damage, would result in dreadful influence on or bring heavy loss to organizations, enterprises and institutions.

Furthermore, for certain special devices, such as a host equipped with a special software control, and a device at an engineer station/staff station in certain industrial fields, generally no network flow control software and security protection software adapted to the system of the host/device is sold on the market because the system is special or because the installation of the flow control software or the security software is easy to cause the compatibility problem of the original software of the host, and even influence performance. In addition, the host of the engineer station/staff station basically does not upgrade an operating system after the host gets on line. Even after flow monitoring security software is installed, the host generally does not update an anti-malicious code software version or a malicious code library in time, and thus cannot play an overall flow control, network data filtration/audit, and security protection roles.

SUMMARY

On the basis of the existing status, the present invention provides an external terminal protection device and a protection system for data flow control to solve the above problem. In the present invention, various interfaces of a protected host are taken over, and the use of a USB interface or a serial interface device of the protected host must be completed via the external terminal protection device, such that the USB interface or serial interface of the protected host can be protected without installing security protection software on the protected host.

In a first aspect, the present application provides an external terminal protection device for data flow control. The external terminal protection device includes: an interface control module, used for providing a plurality of data interfaces respectively connected to a protected host and one or more external devices; and a system control board, used for monitoring in real time a data transmission state of each data interface in the interface control module, and controlling the data flow of each data interface.

Optionally, the external terminal protection device for data flow control is externally connected to the protected host, and the interface control module is correspondingly connected to each data interface of the protected host according to types.

Optionally, the plurality of data interfaces of the interface control module further include an internal interface, an external interface, and a forwarding interface; the internal interface is used to correspondingly connect each data interface of the protected host according to interface types; the external interface is used to access one or more external devices; the external devices are suitable to interact data with the protected host via the external terminal protection device; and the forwarding interface is used to forward a data flow of each type of interface to the system control module.

Optionally, the interface control module further includes a hardware control logic, for realizing the connection and disconnection of a physical circuit between the interfaces in the interface control module.

Optionally, the system control module is further used to perform security authentication on the external device, so as to determine whether the external device is a licensed access device.

Optionally, after the system control module performs security authentication on the external device and determines that the external device is not a licensed access device, the system control module notifies, via a bus, the interface control module of forbidding the data transmission of the external device; and the hardware control logic of the interface control module keeps a physical circuit between the external interface accessing the external device and the forwarding interface in a disconnected state, so as to filter and forbid the data transmission after the external device is accessed.

Optionally, after the system control module performs security authentication on the external device and determines that the external device is a licensed access device, the system control module notifies, via a bus, the interface control module of allowing the data transmission of the external device; and the hardware control logic of the interface control module switches on the physical circuit between the external interface accessing the external device and the forwarding interface.

Optionally, the data interface further includes one or more network interfaces; the interface control module further includes a switching chip, for obtaining a state of a register of each network interface, and setting an operating mode of the interface control module; and the system control module monitors the state of the register of the network interface in the switching chip, so as to obtain in real time a connection state of each network interface in the interface control module.

Optionally, when the system control module monitors that the connection states of the one or more network interfaces change, an alarm prompt is sent to indicate the state change of the corresponding network interface.

Optionally, the system control module sets the interface control module in a flow mirroring mode via the switching chip, and performs flow mirroring on the internal interface and/or the external interface in the interface control module via the forwarding interface in the interface control module.

Optionally, the system control module sets the interface control module in a network protocol filtration mode via the switching chip, and performs network protocol filtration on the data flow between the internal interface and the external interface in the interface control module via the forwarding interface in the interface control module.

Optionally, the system control module further sets a security policy, and detects the security of data transmitted from the external device accessed to the interface control module; and the interface control module forwards the data flow passing security policy filtration to the protected host.

Optionally, the system control module can be an ARM or x86 based control module.

In a second aspect, the present application provides a protection system for data flow control, including:

one or more external devices, suitable to interact data with a protected host via the external terminal protection device;

a protected host, and the external terminal protection device as described above, wherein the external terminal protection device is externally connected to the protected host, such that the one or more external devices perform interface communication with the protected host via the external terminal protection device.

The technical solution of the present invention at least has the following one or more technical effects: the present invention can take over various data interfaces of the protected host, so as to ensure that the data communications of the interfaces of the protected host are all completed via the external device; the present invention realizes the functions of performing protocol filtering and auditing on various types of data flow of the protected host without installing flow monitoring and security protection software on the protected host, and achieves the effects of low-latency network auditing and high-reliability protocol filtering; moreover, the present invention further achieves the security protection object, greatly reduces network security risk of the entire system, and comprehensively eliminates potential security hazards such as Trojan Horse virus implantation and flow anomaly that may be generated by the interfaces.

DETAILED DESCRIPTION

Figure 1:
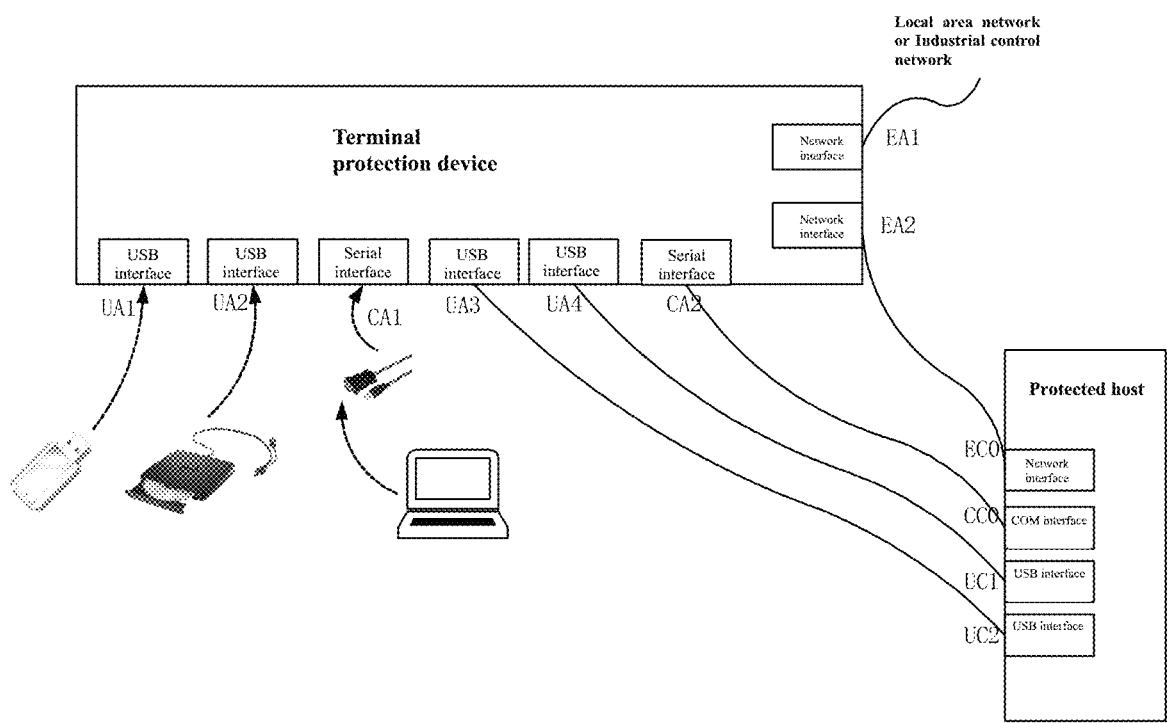
FIG. 1 is an application scenario of the protection system for data flow control according to the present invention.

The exemplary embodiments of the present disclosure will be described in details hereafter with reference to the drawings. Although the exemplary embodiments of the present disclosure are shown in the drawings, it should be understood that the present disclosure can be realized in various forms and shall not be limited to the embodiments elaborated herein. On the contrary, the embodiments are provided such that the present disclosure can be understood more thoroughly and the scope of the present disclosure can be completely conveyed to a person skilled in the art.

The term "and/or" herein only describes an association relationship between associated objects, and can denote three relationships, for example, A and/or B can denote A, both A and B, and B. In addition, the character "/" herein generally denote that the former and latter associated objects are in an "or" relationship.

The external terminal protection device for data flow control provided by the present invention includes an interface control module and a system control module. The interface control module is used to provide a plurality of data interfaces respectively connected to a protected host and one or more external devices. The system control module is used to monitor in real time a data transmission state of each data interface in the interface control module, and control the data flow of each data interface. Therefore, the present invention provides a hardware form terminal protection device, realizes the functions of performing protocol filtering and auditing on various types of data flow without installing flow monitoring and security protection software on the protected host, and achieves the effects of low-latency network auditing and high-reliability protocol filtering, thereby comprehensively eliminating the potential security hazards such as Trojan virus implantation and flow anomaly that may be generated by the interfaces.

It should be noted that the term "module" in the present invention is a hardware module consisting of tangible electronic elements such as a circuit, a data processing apparatus, a memory, a buffer and the like. In the present invention, the interface control module and the system control module can be a physically or functionally independent element combination, and can also be a physically or functionally integrated integral element combination. For example, as an embodiment, the interface control module consists of an interface control board, and the system control module consists of a system control board; the interface control board and the system control board are both circuit boards integrated with electronic elements, and are connected via a bus. In other embodiments, the interface control module and the system control module can also be integrated on one circuit board. Therefore, the key of the present invention is a control relationship between the interface control module and the system control module, but not limited to the space or physical connection combination modes of the electronic elements forming the modules.

Embodiment

FIG. 1 shows an application scenario of an embodiment of the protection system for data flow control according to the present invention.

As shown in FIG. 1, in order to control the data flow of the protected host, all the interfaces of the protected host need to be taken over. Therefore, the external terminal protection device of the present invention is provided with internal interfaces corresponding to the interfaces of the protected host, and is further provided with corresponding types of external interfaces, wherein the internal interface is used to connect the protected host, and the external interface is used to connect the external device which needs to interact data with the protected host. The external terminal protection device is externally connected to the protected host; the interfaces (such as USB interfaces UC1, UC2, a COM interface CC0, a network interface EC0) on the protected host to be protected are connected to corresponding types of internal interfaces of the external terminal protection device via various types of connecting wires, for example, the interfaces UC1 and UC2 of the protected host are respectively connected to internal USB interfaces UA4 and UA3 of the external terminal protection device, the serial interface CC0 is connected to an internal serial interface CA2, and the network interface EC0 is connected to an internal network interface EA2. Various external devices (a U disk, an optical disk driver, a serial interface connection device and the like) all access the external interfaces of the external terminal protection device, and can communicate data with the protected host only via the external terminal protection device, so as to control the data flow between the external device and the protected host, for example, an external U disk device accesses an external interface UA1 of the external terminal protection device, the USB optical disk driver accesses an external interface UA2, and the serial interface connection device accesses an external interface CA1. The external devices such as a U disk, a USB optical disk driver, and a serial interface connection device which need to communicate data with the protected host cannot directly access the protected host, but must access corresponding external interfaces of the external terminal protection device to perform forwarding communication.

In this way, the data transmitted by the external device first needs to pass the data flow control of the external terminal protection device, and then the external terminal protection device controls data transmission by means of protocol filtration, flow mirroring, flow auditing, security detection and the like.

Figure 2:
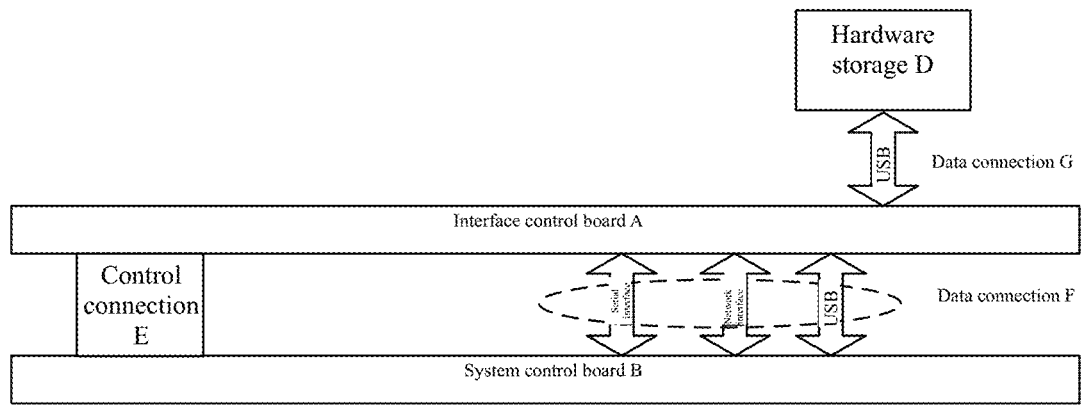
FIG. 2 is a schematic view of an internal structure of the external terminal protection device according to the present invention.

FIG. 2 shows an embodiment of an internal structure of the external terminal protection device according to the present invention.

In the embodiment, the external terminal protection device mainly consists of an interface control board A and a system control board B, wherein the interface control board A supports USB, serial interface and network communication, and is connected to the system control board B via a connecting control line E (for example, a bus); and the system control board B is used to control different operating modes of interfaces on the interface control board A, such as the USB interface, the serial interface, and the network interface, so as to realize the function of performing security control on the access of various external devices. The system control board A can control the operating mode of each interface; the operating mode includes: available, not available, network protocol filtration, flow mirroring, flow auditing and the like. However, the present invention is not limited to specific operating mode control types. The system control board B can be connected to the interface control board A via an interface I2C or SPI. However, the present invention is not limited to such specific control connection interfaces. The interface control board forwards, via various types of forwarding interfaces (the serial interface, the network interface and the USB in a data connection F), the data flow transmitted in the external interface and the internal interface to the system control board.

The interface control board in the external terminal protection device can also access an internal memory, such as the hardware storage D in FIG. 2; the internal memory is used to transfer and store the data exchanged between the interface control board and the interfaces.

When an external device accesses an external interface of the interface control board, the system control board performs security authentication on the interface of the interface control board according to a preset security policy, so as to determine whether the external device is a licensed access device.

In the embodiment, the security functions realized by the external terminal protection device include but not limited to: an administrator presets a permission and a security policy for the external terminal protection device; the security policy includes but not limited to: a data import enabling policy (for example, a USB interface), a data export enabling policy (for example, a USB interface), a USB access device limitation policy (for example, a USB device based vendor ID, namely a supplier identification code, and/or a product ID, namely a product identification code), a data import anti-virus policy, a policy for controlling data export black and white lists, a data export format control policy, a serial interface access enabling policy, a USB interface plug-in protection policy, a network communication audit enabling policy, a firewall function enabling policy, a policy for serial interface command black and white lists and the like.

In a preferred embodiment, the security policy includes: after the administrator sets the security policies, the relevant security policies will be executed by the external terminal protection device one by one.

In a preferred embodiment, the security policy includes: the administrator further controls whether the external terminal protection device enters a monitoring protection mode, in which mode the connection with the protected host will be monitored and an alarm will be sent in case of abnormality.

In a preferred embodiment, the security policy includes: when an abnormality alarm or an interface access situation needs to be recorded for the administrator to query subsequently, the internal memory is further used to record alarm information or interface access log information.

In a preferred embodiment, the interface control board further includes a hardware control logic, for realizing the connection and disconnection of a physical circuit between the interfaces in the interface control board. After the system control board performs security authentication on the external device through the security policy and determines that the external device is not a licensed access device, the system control board notifies, via a bus, the hardware control logic of the interface control board of keeping a physical circuit between the external interface accessing the external device and the forwarding interface in a disconnected state, so as to filter and forbid the data transmission after the external device is accessed. After the system control board performs security authentication on the external device and determines that the external device is a licensed access device, the system control board notifies, via a bus, the interface control board of allowing the data transmission of the external device; and the hardware control logic of the interface control board switches on the physical circuit between the external interface accessing the external device and the forwarding interface.

Figure 3:
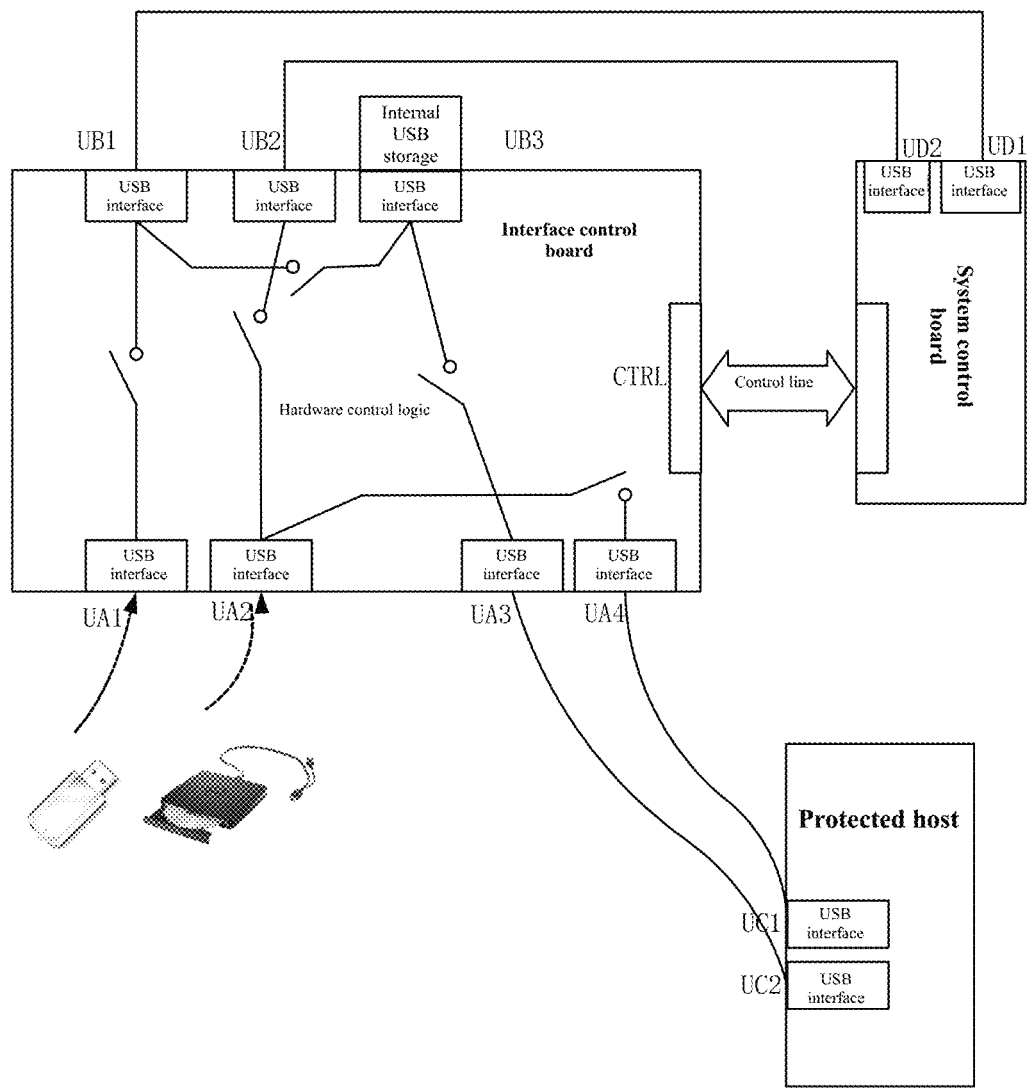
FIG. 3 is a USB data flow control embodiment of the external terminal protection device according to the present invention.

FIG. 3 shows a USB data flow control embodiment of the external terminal protection device according to the present invention.

The interface control board further includes a hardware control logic, for realizing the connection and disconnection of a physical circuit between the interfaces in the interface control board. The internal USB interface UA3 of the interface control board is connected to the USB interface of the protected host; the forwarding interfaces UB1 and UB2 are respectively connected to the USB interfaces UD3 and UD4 of the system control board; an external device U disk to be accessed or a mobile storage medium is plugged in the external USB interface UA1; an internal USB storage for transferring and storing data is plugged in UB3; a CTRL interface, as a bus interface, is connected to a control interface of the system control board.

When data in the external device U disk needs to be imported to the protected host, the system control board transmits a control instruction to the interface control board via the bus, so as to control the hardware control logic to switch on a physical circuit between UA1 and UB1 and copy the data Data1 in the U disk to a buffer memory of the system control board, in which process the hardware control logic keeps a physical circuit between the forwarding interface UB1 (connected to the system control board) and UB3 (connected to the internal USB storage) in the disconnected state, and keeps a physical circuit between the internal USB interface UA3 (connected to the protected host) and UB3 in the disconnected state.

Afterwards, the hardware control logic disconnects the physical circuit between UA1 and UB1, switches the physical circuit between UB1 and UB3, and accesses the data of the internal USB storage of UB3 to the interface UB1; the system control board performs security detection on the data Data1 in the buffer memory; therefore, the system control board can perform security detection, such as virus killing, on the USB storage plugged in the UA1 under the situation that the protected host is isolated. After Data1 passes the security detection, the data Data1 is copied to the internal USB storage of the interface UB3 of the interface control board, in which process the hardware control logic controls the physical connections between UA1 and UB1, and between UA3 and UB3 in the disconnected state. Afterwards, the hardware control logic disconnects the physical connection between UB1 and UB3, and switches on the physical circuit between UA3 and UB3, and transmits the data Data1 in the internal USB storage on the interface UB3 to the protected host via the internal interface UA3, in which process the hardware control logic disconnects the physical circuits between UA1 and UB1, and between UB1 and UB3.

Correspondingly, when data in the protected host needs to be exported to the external device U disk, the system control board transmits a control instruction to the interface control board via the bus, so as to control the hardware control logic to switch on the physical circuit between UA3 and UB3; the internal USB storage on the interface UB3 is digitally connected to the protected host; a user operates the protected host B, and imports data Data2 to the internal USB storage, in which process the hardware control logic keeps the physical circuits between the external interface UA1 and the forwarding interface UB1, and between UB1 and UB3 in the disconnected state. Afterwards, the hardware control logic disconnects the physical circuit between UA3 and UB3, switches on the physical circuit between UB1 and UB3, and forwards the data Data2 in the internal USB storage on the interface UB3 to the buffer memory of the system control board via the forwarding interface UB1; the system control board performs compliance check on the data Data2 in the buffer memory, and determines whether the exported data complies with a preset compliance policy, in which process the hardware control logic keeps the physical circuits between the external interface UA1 and the forwarding interface UB1, and between the internal interface UA3 and UB3 in the disconnected state. After the exported data Data2 is determined to pass the compliance check, the hardware control logic switches on the physical circuit between the external interface UA1 and the forwarding interface UB1, and copies the data Data2 to the external device U disk of the interface UA1, in which process the hardware control logic keeps the physical circuits between the forwarding interfaces UB1 and UB3, and between the internal interface UA3 and UB3 in the disconnected state. Up to this point, a data export process is completed.

It can be seen from the control of the hardware control logic in the data import and export processes of the terminal protection device in the embodiment that only one connection is switched on at any time, and the other connections are in the physically disconnected state, thereby ensuring that data flow filtration and forbidding control is performed on all the unidirectionally/bidirectionally transmitted data between the accessed external device and the protected host.

In still another embodiment as shown in FIG. 3, the terminal protection device further provides a non-storage type USB device direct-connection method for some non-storage type USB devices to be directly accessed, such as a USB optical disk driver, an encryption lock and the like. Similar to the above data import and export control, the device direct-connection control logic controls, via the system control board, the hardware control logic of the interface control board to realize the control of the data flow of the USB device; the hardware connection situation is as follows: the internal USB interface UA4 of the interface control board in the terminal protection device is connected to the USB interface of the protected host; the forwarding interface UB2 accesses the USB interface of the system control board; the external device (for example, the USB optical disk driver) to be directly connected to the protected host B is plugged in the external USB interface UA2; and the CTRL interface of the interface control board is connected to the control interface of the system control board via the bus.

In the embodiment, the terminal protection device adopts the following method to control USB device direct-connection: when the external device (for example, a USB optical disk driver) to be directly connected to the protected host B is plugged in the external USB interface UA2 of the terminal protection device, the interface control board notifies the system control board via the bus, and the system control board controls the hardware control logic of the interface control board to switch on the physical circuit between the interface UA2 and the forwarding interface UB2, such that the USB optical disk driver plugged in the interface UA2 is connected to the USB interface of the system control board, in which process the hardware control logic keeps the physical circuit between the interface UA2 and the internal interface UA4 of the protected host in the disconnected state.

The system control board performs security authentication on the USB optical disk driver on the interface UA2, and determines whether the external device is a licensed access device; after the USB optical disk driver is determined to be a licensed access device, the hardware control logic switches on the physical circuit between the external interface UA2 and the internal interface UA4, so as to connect the USB optical disk driver plugged in the interface UA2 to the protected host.

When the system control board monitors that the connection states of one or more interfaces change, the hardware control logic automatically disconnects the physical circuits between the interfaces and other interfaces. For example, when the external device plugged in the interface UA2 accesses the interface UA4, the system control board monitors in real time the connection state of the external device plugged in the interface UA2 of the interface control board, and automatically disconnects the circuit once the external device is detected to be unplugged from the interface.

Figure 4:
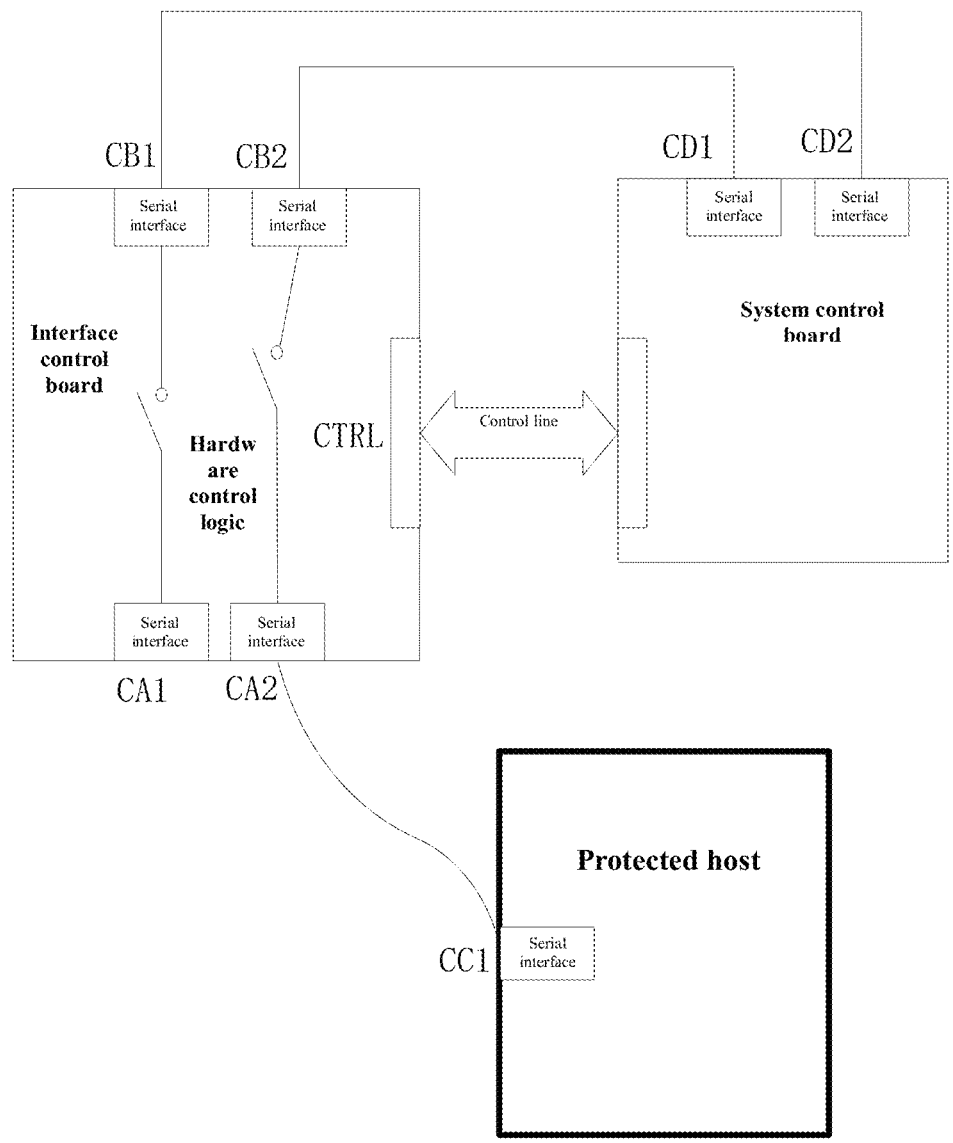
FIG. 4 is a serial interface data flow control embodiment of the external terminal protection device according to the present invention.

FIG. 4 shows a serial interface data flow control embodiment of the external terminal protection device according to the present invention. With reference to FIG. 4, serial interface communication data can be filtered, and an illegal command can be forbidden from inputting. The system control board notifies, via the bus, the hardware control logic of the interface control board of controlling the disconnection and connection of the physical circuits between the external serial interface CA1 and the forwarding interface CB1, and between the internal serial interface CA2 and the forwarding interface CB2. The external device accessed to the external serial interface CA1 first needs to pass the security authentication of the system control board, and then the serial interfaces CD1 and CD2 exchange data; the hardware control logic of the interface control board switches on the physical circuits between the serial interface CA1 and CB1, and between CA2 and CB2, so as to realize data communication from the external serial device on the external serial interface CA1 to the internal serial interface CA2, and then to the protected host.

Further, the system control board disconnects the physical circuits between CA1 and CB1, and between CA2 and CB2 via the hardware control logic, so as to switch off a serial communication circuit between CA1 and CA2. Since the communication between CA1 and CA2 is forwarded via CB1 and CB2, the system control board can filter serial interface communication data and forbid an illegal command from inputting.

Figure 5:
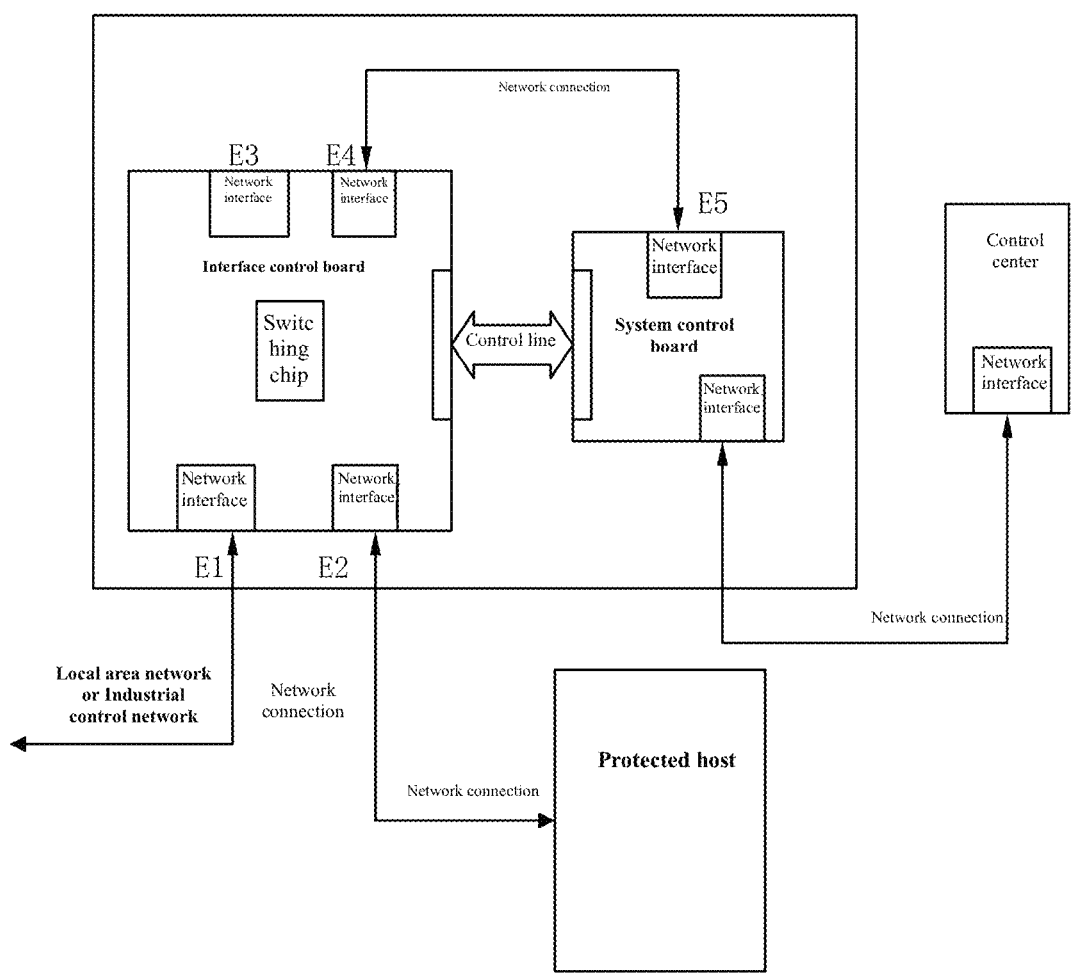
FIG. 5 is a network data flow control embodiment of the external terminal protection device according to the present invention.

FIG. 5 shows a network data flow control embodiment of the external terminal protection device according to the present invention. In the embodiment, the terminal protection device depends on a switching chip, particularly a dedicated network switching chip, to realize the network data flow control and auditing functions. Specifically, the switching chip is integrated on the interface control board of the terminal protection device, and is used to obtain a state of a register of each data interface, and set an operating mode of the interface control board. The interface control board is connected to the system control board via the bus (equivalent to the control line as shown in the figure); and the network interface E5 of the system control board is connected to the forwarding interface network interface E4 of the interface control board. Further, the terminal protection device in the embodiment can adopt the dedicated network switching chip, and supports the network flow mirroring, auditing, and network protocol filtration functions without influencing network latency.

The terminal protection device is applied to an occasion having a high requirement for network latency; the accessed network device is required to have no obvious influence on existing network latency and structure, and the deployment mode is required to be flexible. The network auditing firewall design of the terminal protection device in the solution realizes network data flow control on the basis of dedicated hardware, thereby realizing low-latency network auditing and high-reliability protocol filtration.

In another embodiment as shown in FIG. 5, the terminal protection device has the function of preventing a network cable from be unplugged; the system control board acquires connection states of the external network interface E1 and the internal network interface E2 by reading the state of the register of the network interface in the switching chip, wherein the connection state is described to be: link connection fails/succeeds. The system control board acquires network state information by monitoring the connection state of the network interface E1/E2, and sends an alarm for network cable plug and unplug situations.

In still another embodiment as shown in FIG. 5, the terminal protection device may have a network auditing function. The external interface E1 accesses a local area network or an industrial control network, and the internal interface E2 is connected to the network interface of the protected host B. The system control board sets, on the basis of a local operation instruction or a remote network control instruction of a remote control center, the interface control board in a flow mirroring mode via the switching chip, and performs flow mirroring on the network interfaces E1 and E2 in the interface control board via the forwarding interface E4 in the interface control board. Therefore, the network interface E4 can acquire the network communication data between the two network interfaces E1 and E2 without influencing the data communication between E1 and E2, so as to realize the network flow auditing between the protected host B and the external local area network or the industrial control network. Furthermore, the mode adopts the switching chip to set the operating mode of the interface control board without changing network topology or adding an additional network device.

In still another embodiment as shown in FIG. 5, the terminal protection device may have a network protocol filtration function. The system control board sets, on the basis of a local operation instruction or a remote network control instruction of the remote control center, the interface control board in a network protocol filtration mode via the switching chip, and performs, via the forwarding interface E4 in the interface control board, network protocol filtration on the data flow between the external interface E1 and the internal interface E2 in the interface control board, so as to realize the network protocol filtration of the data flow between the protected host B and the external local area network or the industrial control Ethernet.

Further, the system control board can control the switching chip to switch the operating mode of the network interface of the interface control board, for example, the system control board can control the switching chip to switch the flow mirroring mode of the network interface E4 to the network protocol filtration mode, or switch the network protocol filtration mode of the network interface E4 to the flow mirroring mode, or perform switching between other operating modes.

Figure 6:
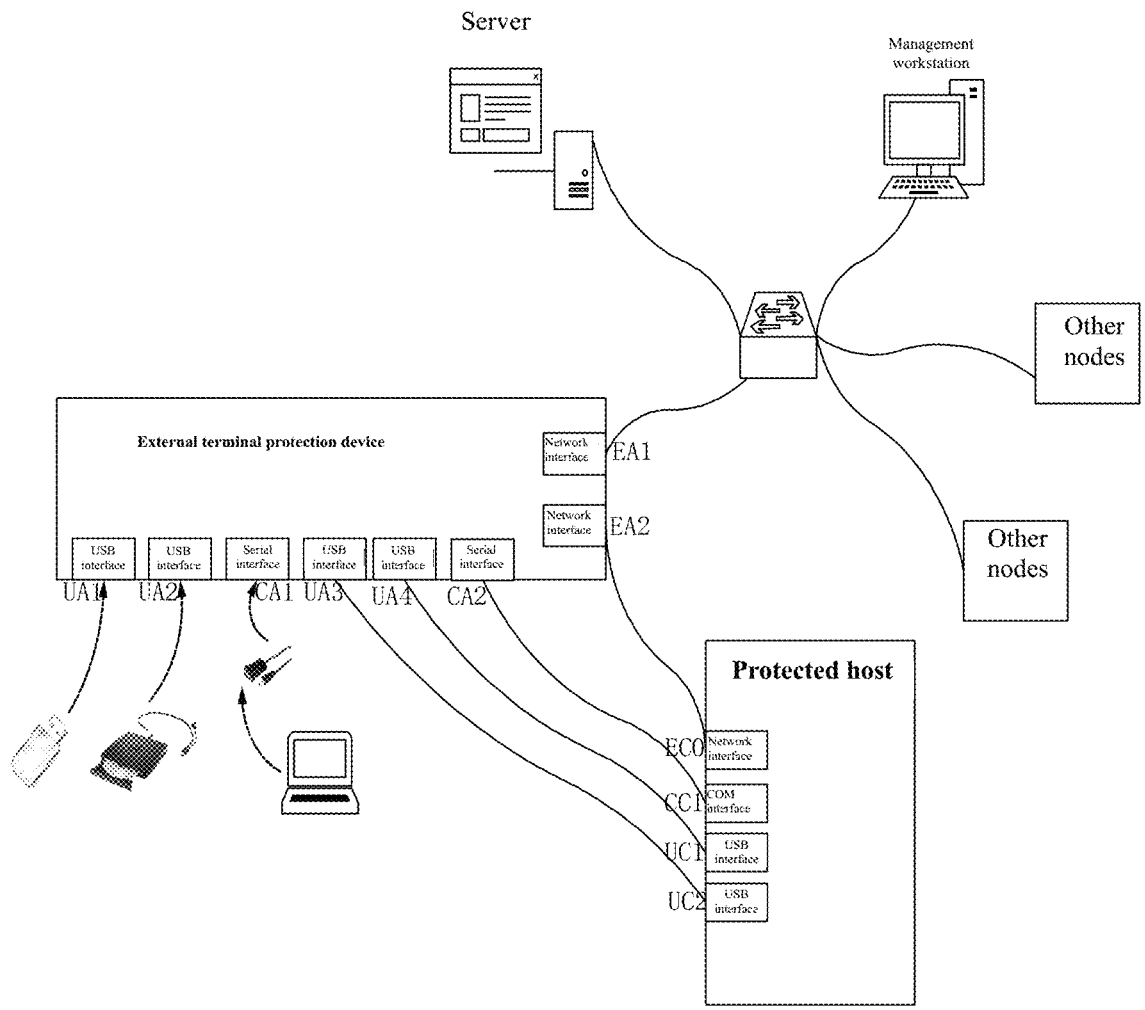
FIG. 6 is a network deployment embodiment of the external terminal protection system according to the present invention.

FIG. 6 is a network deployment embodiment of the protection system based on the external terminal protection device according to the present invention. The protection system includes one or more external devices, a protected host, and an external terminal protection device, wherein the external terminal protection device is externally connected to the protected host, such that the one or more external devices perform interface communication with the protected host via the external terminal protection device. Herein, the external terminal protection device is as described above, and will not be repeated here.

Further, the protection system further includes a control center for remotely controlling the external terminal protection device, wherein the control center consists of a server, a management workstation, and other nodes, and is connected to a network interface EA1 of the external terminal protection device via a network switching node.

In the description provided herein, a large number of specific details are described. However, it is understood that the embodiments of the invention may be practiced without these specific details. In some examples, well known methods, structures and technologies have not been described in detail as not to obscure understanding of the description.

Similarly, it should be understood that in order to simplify the present disclosure and help people understand one or more aspects of the present invention, in the description of the above exemplary embodiments of the present invention, the features of the present invention sometimes are together grouped into a single embodiment, a figure, or the descriptions thereof. However, the disclosed method should not be interpreted to reflect the following intention: the claimed invention claims more features than the features explicitly stated in each claim. Specifically, as the following claims reflect, the inventive aspects lie in less than all features of a single embodiment disclosed previously. Therefore, claims that follow a specific embodiment are hereby expressly incorporated into the specific embodiment, with each claim standing on its own as a separate embodiment of the disclosure.

Those skilled in the art may understand that the modules in the device in the embodiment may be adaptively changed and set in one or more devices different from the present embodiment. The modules or units or components in the embodiments may be combined into one module or unit or assembly, and furthermore, these may be divided into a plurality of submodules or subunits or sub-assemblies. Except that at least some of such features and/or processes or units are mutually exclusive, all features disclosed in this specification (including the accompanying claims, abstract, and drawings) and all processes or units of any method or device so disclosed may be combined in any combination. Unless otherwise stated, the features disclosed in the specification (including the accompanying claims, abstract, and the drawings) can be replaced with alternative features providing the same, equivalent or similar objects.

In addition, those skilled in the art can understand that although some embodiments described herein include certain features included in other embodiments and not others, combinations of features of different embodiments are meant to be within the scope of the disclosure and form different embodiments. For example, in the following claims, any one of the claimed embodiments may be used in any combination.

The component embodiment of the present invention can be realized as hardware, or a software module operating on one or more processors, or a combination thereof. A person skilled in the art should understand that in practice, a microprocessor or a digital signal processor (DSP) can be used to realize some or the entire functions of some or the entire components of a photographing and recording apparatus, a computing device, and a computer readable storage medium according to the literal contents of the embodiments of the present invention. The present invention can also be realized as a device or an apparatus program (for example, a computer program and a computer program product) for executing a part of or the entire method described herein. Such program realizing the present invention can be stored in a computer readable medium, or can adopt the form having one or more signals. Such signals can be downloaded from an Internet website, or provided on a carrier signal, or provided in any other form.

The invention claimed is:

1. An external terminal protection device for data flow control comprising an interface control module and a system control module, wherein the interface control module includes a plurality of data interfaces respectively connected to a protected host and one or more external devices; the data interfaces further comprise an internal interface, an external interface, and a forwarding interface:

the internal interface is configured to correspondingly connect each data interface of the protected host according to interface types; the external interface is configured to access one or more external devices; the external devices are configured to interact data with the protected host via the external terminal protection device; the forwarding interface is configured to forward data flow of each type of interface to the system control module; and the system control module is configured to obtain in real time a connection state of each data interface, monitor in real time a data transmission state of each data interface in the interface control module, and control the data flow of each data interface;

the system control module is further configured to perform security authentication on each external device so as to determine whether the external device is a licensed access device:

the interface control module further comprises a hardware control logic module for realizing the connection and disconnection of a physical circuit between the interfaces in the interface control module;

the system control module is configured to notify the interface control module via a bus to forbid the data transmission by the external device and the hardware control logic module of the interface control module is configured to keep a physical circuit between the external interface accessing the external device and the forwarding interface in a disconnected state so as to filter and forbid the data transmission after the external device is accessed after the system control module performs security authentication on the external device and determines that the external device is not a licensed access device: and the system control module is configured to notify the interface control module via a bus to allow the data transmission by the external device and the hardware control logic module of the interface control module is configured to switch on the physical circuit between the external interface accessing the external device and the forwarding interface after the system control module performs security authentication on the external device and determines that the external device is a licensed access device;

wherein the interface control module further comprises a switching chip for obtaining a state of a register of each data interface and setting an operating mode of the interface control module; and the system control module is configured to monitor the state of the register of the data interface in the switching chip so as to obtain in real time a connection state of each data interface in the interface control module.

2. The external terminal protection device according to claim 1, wherein
when the system control module monitors that the connection states of the one or more data interfaces change, an alarm prompt is sent to indicate the state change of the corresponding data interface.

3. The external terminal protection device according to claim 1, wherein
the system control module is configured to set the interface control module in a flow mirroring mode via the switching chip and perform flow mirroring on the internal interface and/or the external interface in the interface control module via the forwarding interface in the interface control module.

4. The external terminal protection device according to claim 1, wherein
the system control module is configured to set the interface control module in a network protocol filtration mode via the switching chip and perform network protocol filtration on the data flow between the internal interface and the external interface in the interface control module via the forwarding interface in the interface control module.

5. The external terminal protection device according to claim 1, wherein
the system control module is configured to set a security policy and detect the security of data transmitted from the external device accessed to the interface control module; and
the interface control module is configured to forward the data flow passing security policy filtration to the protected host.

6. The external terminal protection device according to claim 1,
wherein
the interface control module includes an internal memory, and the hardware control logic is configured to connect and disconnect a physical circuit within the interface control module between the internal memory and the forwarding interface or the internal interface,
the system control module is connected to the interface control module by a control line and includes a buffer memory and an interface connecting the buffer memory to the forwarding interface of the interface control module,
the system control module is configured to copy data from the external device to the buffer memory of the system control module via the forwarding interface and the interface of the system control module while keeping the internal interface disconnected from the internal memory when the security authentication by the system control module determines that the external device connected to the external interface is a licensed access device,
the system control module is configured to perform security detection on the data copied from the external device to the buffer memory,
the system control module is configured to control the hardware control logic to disconnect the external interface from the forwarding interface and connect the forwarding interface to the internal memory of the interface control module to copy the data which underwent security detection in the buffer memory from the buffer memory to the internal memory via the forwarding interface while keeping the internal interface disconnected from the internal memory, and the system control module is configured to control the hardware control logic to disconnect the forwarding interface from the internal memory and to connect the internal memory to the internal interface to transmit the data which underwent security detection and was copied to the internal memory to the protected host via the internal interface.

7. The external terminal protection device according to claim 6, wherein
the system control module is configured to control the hardware control logic to connect the internal interface to the internal memory of the interface control module and import data from the protected host to the internal memory via the internal interface while keeping the forwarding interface disconnected from the external interface and the internal memory when the security authentication by the system control module determines that the external device connected to the external interface is a licensed access device,
the system control module is configured to control the hardware control logic to disconnect the internal interface from the internal memory and connect the internal memory to the forwarding interface to forward the data from the protected host which was imported into the internal memory to the buffer memory of the system control module via the forwarding interface and the interface of the system control module while keeping the forwarding interface disconnected from the external interface,
the system control module is configured to perform a compliance check on the data which was forwarded to the buffer memory from the internal memory while keeping the forwarding interface disconnected from the external interface and the internal memory, and
the system control module is configured to control the hardware control logic to connect the forwarding interface to the external memory to copy the data which underwent the compliance check from the buffer memory to the external device via the forwarding interface and the external interface while keeping the internal memory disconnected from the forwarding interface and the internal interface.

8. A protection system for data flow control comprising: a protected host; an external terminal protection device for data flow control comprising an interface control module and a system control module, wherein the interface control module includes a plurality of data interfaces respectively connected to the protected host and one or more external devices; the data interfaces further comprise an internal interface, an external interface, and a forwarding interface; the internal interface is configured to correspondingly connect each data interface of the protected host according to interface types; the external interface is configured to access one or more external devices; the external devices are configured to interact data with the protected host via the external terminal protection device; the forwarding interface is configured to forward data flow of each type of interface to the system control module: and the system control module is configured to obtain in real time a connection state of each data interface, monitor in real time a data transmission state of each data interface in the interface control module, and control the data flow of each data interface: the system control module is further configured to perform security authentication on each external device so as to determine whether the external device is a licensed access device; the interface control module further comprises a hardware control logic module for realizing the connection and disconnection of a physical circuit between the interfaces in the interface control module; the system control module is configured to notify the interface control module via a bus to forbid the data transmission by the external device and the hardware control logic module of the interface control module is configured to keep a physical circuit between the external interface accessing the external device and the forwarding interface in a disconnected state so as to filter and forbid the data transmission after the external device is accessed after the system control module performs security authentication on the external device and determines that the external device is not a licensed access device; and the system control module is configured to notify the interface control module via a bus to allow the data transmission by the external device and the hardware control logic module of the interface control module is configured to switch on the physical circuit between the external interface accessing the external device and the forwarding interface after the system control module performs security authentication on the external device and determines that the external device is a licensed access device;

wherein
the interface control module further comprises a switching chip for obtaining a state of a register of each data interface and setting an operating mode of the interface control module; and
the system control module is configured to monitor the state of the register of the data interface in the switching chip so as to obtain in real time a connection state of each data interface in the interface control module.

9. The protection system according to claim 8, wherein the interface control module further comprises a switching chip for obtaining a state of a register of each data interface and setting an operating mode of the interface control module; and
the system control module is configured to monitor the state of the register of the data interface in the switching chip so as to obtain in real time a connection state of each data interface in the interface control module.

10. A The protection system according to claim 9, wherein the system control module is configured to set a security policy and detect the security of data transmitted from the external device accessed to the interface control module; and
the interface control module is configured to forward the data flow passing security policy filtration to the protected host.

11. The protection system according to claim 9, wherein the system control module is configured to set the interface control module in a network protocol filtration mode via the switching chip and perform network protocol filtration on the data flow between the internal interface and the external interface in the interface control module via the forwarding interface in the interface control module.

12. The protection system according to claim 9, wherein the system control module is configured to set the interface control module in a flow mirroring mode via the switching chip and perform flow mirroring on the internal interface and/or the external interface in the interface control module via the forwarding interface in the interface control module.

13. The protection system according to claim 9, wherein when the system control module monitors that the connection states of the one or more data interfaces change, an alarm prompt is sent to indicate the state change of the corresponding data interface.

14. The protection system according to claim 8, wherein the interface control module includes an internal memory, and the hardware control logic is configured to connect and disconnect a physical circuit within the interface control module between the internal memory and the forwarding interface or the internal interface,
the system control module is connected to the interface control module by a control line and includes a buffer memory and an interface connecting the buffer memory to the forwarding interface of the interface control module,
the system control module is configured to copy data from the external device to the buffer memory of the system control module via the forwarding interface and the interface of the system control module while keeping the internal interface disconnected from the internal memory when the security authentication by the system control module determines that the external device connected to the external interface is a licensed access device,
the system control module is configured to perform security detection on the data copied from the external device to the buffer memory,
the system control module is configured to control the hardware control logic to disconnect the external interface from the forwarding interface and connect the forwarding interface to the internal memory of the interface control module to copy the data which underwent security detection in the buffer memory from the buffer memory to the internal memory via the forwarding interface while keeping the internal interface disconnected from the internal memory, and
the system control module is configured to control the hardware control logic to disconnect the forwarding interface from the internal memory and to connect the internal memory to the internal interface to transmit the data which underwent security detection and was copied to the internal memory to the protected host via the internal interface.

15. The protection system according to claim 14, wherein the system control module is configured to control the hardware control logic to connect the internal interface to the internal memory of the interface control module and import data from the protected host to the internal memory via the internal interface while keeping the forwarding interface disconnected from the external interface and the internal memory when the security authentication by the system control module determines that the external device connected to the external interface is a licensed access device,
the system control module is configured to control the hardware control logic to disconnect the internal interface from the internal memory and connect the internal memory to the forwarding interface to forward the data from the protected host which was imported into the internal memory to the buffer memory of the system control module via the forwarding interface and the interface of the system control module while keeping the forwarding interface disconnected from the external interface,
the system control module is configured to perform a compliance check on the data which was forwarded to the buffer memory from the internal memory while keeping the forwarding interface disconnected from the external interface and the internal memory, and
the system control module is configured to control the hardware control logic to connect the forwarding interface to the external memory to copy the data which underwent the compliance check from the buffer memory to the external device via the forwarding interface and the external interface while keeping the internal memory disconnected from the forwarding interface and the internal interface.

16. The protection system according to claim 8, wherein the one or more external devices are configured to interact data with the protected host via the external terminal protection device, wherein the external terminal protection device is externally connected to the protected device.

* * * * *